Patented Aug. 24, 1937

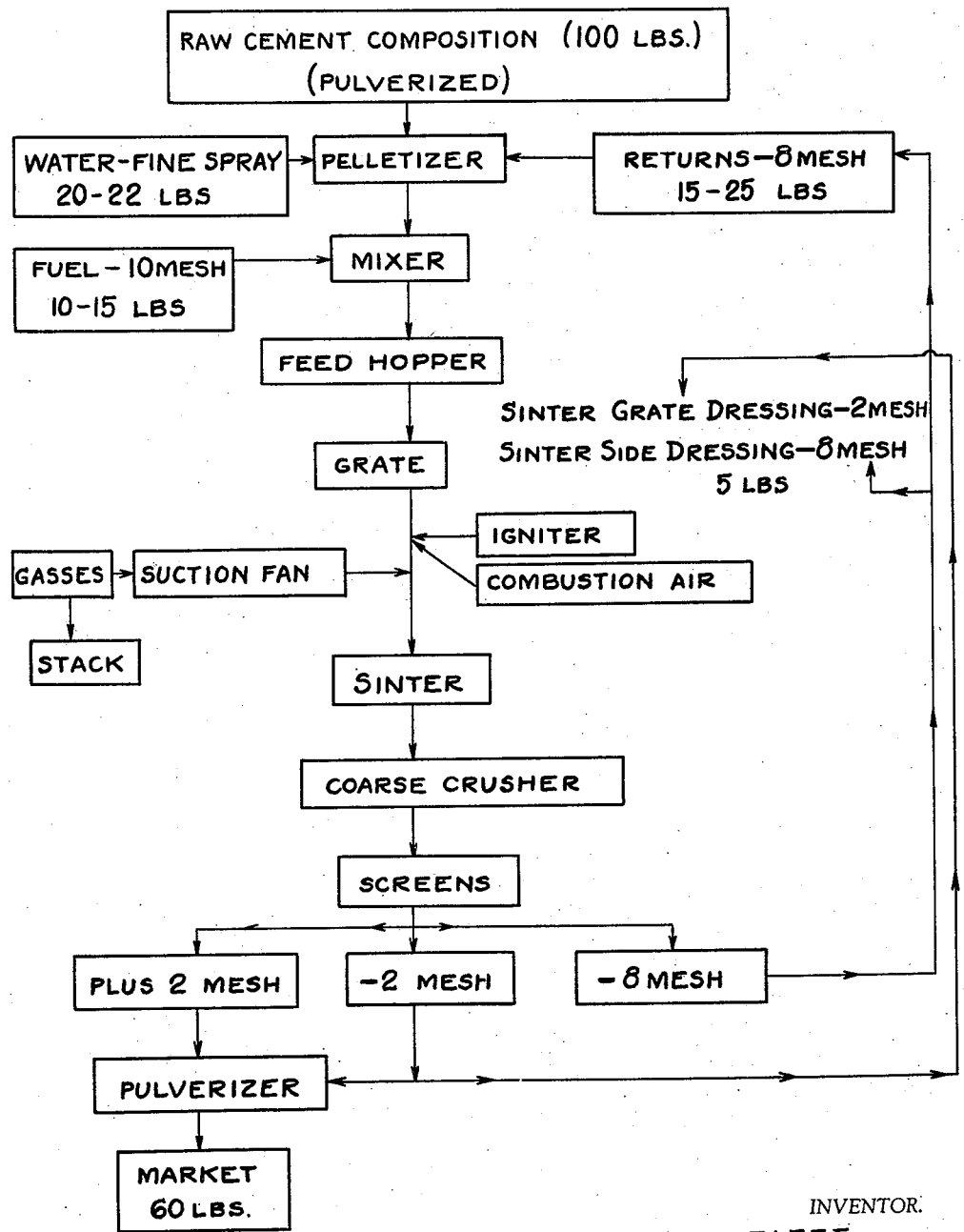

2,090,868

UNITED STATES PATENT OFFICE 2,090,868

PROCESS OF MANUFACTURING CEMENT

Reed W. Hyde, Summit, N. J.

Application July 3, 1934, Serial No. 733,551

6 Claims. (Cl. 263—53)

My present invention relates to a process of manufacturing cement, particularly to a process of sintering a cement forming mixture under forced draft. The invention relates particularly to a sintering process that will readily sinter cement forming mixtures having a high ratio or proportion of lime or calcium to silica and alumina.

Cements having a high ratio of lime to silica and alumina have certain advantages over low ratio cements, having the property, among others, of developing a high early strength. High lime mixtures are, however, more difficult to burn as, in burning a cement, the temperature must be raised sufficiently high to effect the formation of calcium aluminates and silicates from the lime, alumina and silicate, and when the ratio of lime is higher, a higher temperature is required for this purpose. Unless the temperature is raised sufficiently high to effect this formation of the calcium aluminates and silicates, an excessive amount of free or uncombined lime is left in the finished product.

This is harmful because concrete made from such cement deteriorates rapidly on exposure. Also, cement containing an excessive amount of free lime has a tendency to set before it can be poured or worked, this being known as a "flash set".

An object of my present invention is to provide an improved cement sintering process capable of use in burning cement mixtures generally and capable of readily attaining the high temperature burning conditions required for high lime cements.

The various steps of the process are outlined diagrammatically in the accompanying drawing in the form of a flow sheet.

In the process as outlined in the accompanying drawing, the various ingredients of the cement making composition are finely pulverized or ground, moistened with water and formed into small pellets. Fuel is then mixed with the composition either before pulverizing or, preferably, by application to the surfaces of the pellets already formed. The pellets are then spread on the grate of a sintering furnace, ignited at the upper surface of the bed and a blast of air is then blown downwardly at such a rate and in such a manner as to cause the fuel to burn in a narrow zone which gradually travels downwardly throughout the bed of material to be sintered. The manner of blowing the air through the bed and the manner of burning causes an extremely high temperature in the narrow burning zone because of the rapid combustion and of the preheating of the air passing through a previously burned zone.

At the same time the fused or sintered material is immediately chilled in the combustion zone by the blast of air as soon as the fuel has been completely consumed and the air is preheated before passing to a lower combustion zone. Chilling and consequent imperfect combustion is prevented, the lowermost layer of the mix providing a protecting or insulating layer of previously burned material between the bed of the mix and the grates of the furnace. Similarly, the sides of the bed of material are protected against chilling through the side walls of the furnace by means of an interposed layer of previously burned mix.

When all of the fuel has been burned out, the cement mixture is crushed and passed through a screen in which it is separated into large particles, intermediate particles and fine particles. The large particles are then crushed to form a commercial cement. The finest particles, which are generally of less than 8 mesh, are returned partly to the pelletizer to be mixed with a fresh quantity of mix, and partly to the sintering furnace where they form the protecting layer between the bed of material to be burned and the wall of the furnace or grate. The intermediate material, which is less than 2 mesh, may be sent to the pulverizer or partly to form the layer between the bottom of the bed of material to be burned and the furnace grates.

In carrying out the above process, any suitable type of mixer and pelletizer may be used to mix the finely ground shale and limestone, or other ingredients, and to moisten them to the required consistency as, for example, by a mist or spray of water. In this mixing, any lumps of material are broken up. Then the mixture is rolled to form it into small balls or pellets from about the size of a pinhead to the size of a kernel of rice or, preferably, ranging from about 20 mesh to 6 mesh size. In this mixing the returned fines of the burned crushed material are mixed and dispersed throughout the pellets being formed so that in the subsequent fusing or sintering they may form a starting point for the melting of the cement forming mixture.

A form of apparatus for mixing and pelletizing such as shown in Klugh Patent 1,931,499 may be employed. This apparatus comprises a cylinder or drum having a length about two or three times its diameter and mounted on a slight incline. Within the drum and parallel to, but below and at one side of, its axis is mounted a rotating shaft carrying blades or paddles. This paddle shaft rotates at a faster rate than the drum and in the opposite direction. The material may be moistened while being mixed by means of spray nozzles mounted within the drum. The mix is fed into the drum in a uniform stream and is alternately carried in toward the paddles by the rotation of the drum and violently thrown back by the paddles.

This provides a thorough mixing and ensures the breaking up of any lumps of material. There are no paddles in the lower end portion of the drum and here the moist material rolls up into small pellets the size of which may be regulated by the length of the drum below the paddles, the depth of the material and other conditions of operation.

The fuel required for fusing or sintering the pellets may be mixed with the moistened pulverized ingredients in the pelletizer mixer. This, however, has the disadvantage that the combustion of the fuel throughout the pellets may not be complete, leaving a small quantity of residual carbon and giving a grayish cast to the cement. A preferable step is to add the fuel to the stream of pellets after the latter are formed and before being fed to the sintering grate. This causes the fuel to adhere to the surfaces of the pellets, particularly if the pellets are passed through a second rotating drum or second pelletizer. The material is burned with the fuel thus positioned on the surfaces of the pellets exposed freely to the air and is more completely burned to give a whiter product. Any suitable fuel such as a fine, solid, carbonaceous fuel such as coke breeze or anthrafine may be used.

The pellets thus coated or incorporated with fuel are supplied to the feed hopper of a blast combustion or sintering apparatus such as shown in the Dwight Patent 1,027,110.

The materials are then fed from the hopper to the grate of the apparatus and are preferably formed into a relatively thick bed of material, that is, one of 8 to 12 inches or more in depth. At the same time a stream of crushed previously burned mixture or clinker is fed into the grates immediately in advance of the raw mixture and in such proportion as to form a supporting bed or layer between the grate and the raw mixture, and of a thickness of about ¾ to 1 inch. Also a stream of the somewhat finer sintered material is fed at each side of the feed hopper so as to form a layer between the bed of raw material and the sides of the grates or furnace. The thickness of this layer may be about ½ inch. The particles of these intermediate layers of previously sintered material should be such as to prevent pellets working into them and thereby not undergoing the required combustion and fusing. This may be accomplished by the apparatus of Dwight and Lloyd Patent No. 1,283,483.

A desirable method of forming a satisfactory layer is first to form a thin layer, for example, ½ inch each, of material about ¼ to ½ inch size and then place on this a second layer of finer material about 8 mesh. This forms a satisfactory layer for the bottom of the grates. Material of less than 8 to 10 mesh is satisfactory between the raw material and the sides of the furnace. The bed thus formed is then fed in a uniform thickness through the furnace, and without packing, which might interfere with the uniform passage of the blast of air through the bed of material, or without other lack of uniformity which might affect the uniform and proper combustion of the mixture.

The combustion of the fuel in the mixture is started by exposing the top of the bed of the charge to an intense heat for a short period of time, thereby igniting the fuel in the upper layer of pellets. Thereupon a blast of air is forced downwardly through the bed of the mixture at a rate sufficient to develop a temperature required for the fusing of the material and the formation of the silicates and aluminates. The temperature attained in burning the fuel is a function of the rate of combustion. By placing the fuel on the surface of the small pellets it is immediately brought into intimate contact with the air for combustion and rapidly burned. The rate of combustion and the proportion of fuel are sufficient to cause a fusing of the cement mix. As soon, however, as the fuel in the upper surface layer becomes exhausted by the rapid combustion the fused material is instantly chilled by the blast of air, which in turn becomes heated by heat from the fused material and, in this manner, increases the temperature and the rate of combustion in the layer of pellets immediately beneath to which the blast of air then passes. There is thus in successively lower layers an intense melting temperature, promptly followed by a chilling. In the burning, therefore, the combustion proceeds in a downwardly progressing narrow zone. This type of combustion can readily be obtained in apparatus such as shown in the above Patent 1,283,483 by forming the cement materials into pellets coated with fuel and heating with a forced downward blast of air.

Through the preparation of the bed of pellets as above described so as to provide a rapid and uniform passage of air and rapid removal of the waste combustion gases, temperatures of 2800° to 3300° may readily be obtained.

Since the combustion proceeds within the bed, high temperature heat is directly available. Also, inasmuch as the combustion takes place in a thin horizontal downwardly progressing zone having on its opposite side burned clinker and unburned mix, the hot products of combustion are cooled in passing through the unburned mixture, giving up their heat to the latter and leaving the bed of material in a relatively cool condition.

Due to the melting of the mixture and its subsequent rapid chilling, it solidifies or "freezes" into a cellular porous mass having innumerable openings for subsequent penetration and flow of air to the combustion zone of lower unburned mix. This porous material is readily crushed between rolls, after which it is separated into the coarse, intermediate and fine material to be respectively ground to the finished product or returned to the sintering bed or the pelletizer mixer. The return of the fine material to the pelletizer mixer facilitates the formation of pellets and these particles of returned material, which are generally larger than the pulverized raw material, form nuclei to which the moist pulverized particles adhere. These returned particles are also more readily fused than the raw mix and thus serve to start the fusion of the latter and bring the several ingredients into intimate contact for effective chemical reaction and formation of the silicates and aluminates.

The quantities of returns that may be sent to the pelletizer are governed largely by the quantity of lime in the mixture, a larger proportion of returns being used with a larger proportion of lime. Returns to the extent of 15 to 25% are generally effective for the above purposes and generally increase the output of a given size apparatus to a degree more than equivalent to the proportion used. Proportions as high as 50 or 60% of returns may be used and, when the lime content is very high, a double sintering may be employed in which the material is first sintered alone or with a small percentage of returns and the resulting product is sintered a second time, using a small amount of fuel.

The following are examples illustrative of the process:

Example I

Finely pulverized anthracite of less than 12 mesh is added to a raw mixture consisting of pulverized limestone, the proportion of fuel to cement mixture being 1 to 10 by weight. The resulting mixture is pelletized and burned at the rate of 1400 pounds of product per square foot of hearth area for 24 hours. The product is a cellular, friable readily pulverized sinter cake of excellent character.

Example II

A raw mix is prepared containing previously sintered material of preferably less than 8 mesh and in the proportion of 20 pounds of sintered material to 100 pounds of the cement mixture. The mixture is then formed into pellets, and finely divided anthracite (less than 14 mesh) is added to the pellets adhering to the surface of the latter, 15 pounds of fuel being used per 100 pounds of cement mixture.

The resulting fuel and cement mixture is burned at the rate of 1700 pounds of product per square foot of hearth area for 24 hours. The product is cellular, somewhat less friable than that of Example I, but readily crushed and pulverized and of excellent character. Free lime in the clinker was 1.18% and carbon 0.09%. The cement had the following composition:

|  | Per cent |
|---|---|
| $SiO_2$ | 20.44 |
| $Fe_2O_3$ | 2.50 |
| $Al_2O_3$ | 8.26 |
| $CaO$ | 63.22 |
| $MgO$ | 3.02 |
| $SO_3$ | 1.76 |
| Total | 99.20 |

|  | Per cent |
|---|---|
| Insol | 0.19 |
| Molecular ratio | 2.58 |

Example III

A raw mixture is prepared containing 60 pounds of sintered material or returns, preferably of less than 8 mesh, per 100 pounds of raw mix. This is formed into pellets to which is added pulverized anthracite (less than 14 mesh) at the rate of 15 pounds of fuel to 100 pounds of raw mix. The mixture is then burned as in Example II. The resulting product is somewhat harder than that formed by Example II and contains 1.19% of free lime. The rate of burning is 1400 pounds of product per square foot of grate area for 24 hours.

Example IV

A cement mixture is formed into pellets with 15 pounds of anthracite per 100 pounds of mix and burned as in the above examples. The product is then crushed to pass an 8 mesh screen. Then fine coke (less than 12 mesh) is added in the proportion of six pounds of fuel per 100 pounds of the crushed sintered product and the mixture burned a second time. The product is a strong well fused cake containing 0.15% of free lime and 0.14% of insoluble material.

Example V

Fuel in the ratio of 15 pounds of less than 12 mesh anthracite per 100 pounds of raw mix is added, in one case, before pelletizing and, in the second case, after pelletizing. In each case the material is burned under the same conditions and give a product of similar character except for the residual carbon. The first product had a residual carbon content of 0.5%, while the second had no residual carbon and was lighter than that of the first.

As changes of operation could be made within the scope of my invention, it is intended that all matter contained in the above description or shown in the accompanying drawing shall be interpreted as illustrative and not in a limiting sense.

What I claim is—

1. A method of sintering cement mixes which comprises forming a cement making mixture and fuel into pellets, igniting a bed of said pellets at its upper surface and forcing air downwardly through said bed of pellets to sinter and convert said pellets throughout to cement.

2. A method of sintering cement mixes which comprises forming a finely pulverized cement making mixture and fuel into masses of from about 20 mesh to about 6 mesh in size, igniting a bed of said masses at its upper surface and forcing air downwardly through said bed to sinter and convert said pellets throughout to cement.

3. A method of sintering cement mixes which comprises forming a cement making mixture and fuel into pellets, igniting a bed of said pellets at its upper surface and forcing air downwardly through said bed of pellets to sinter and convert said pellets throughout to cement, and enclosing said bed prior to and during said ignition at its sides and bottom with a layer of finished material.

4. A method of sintering cement mixes which comprises forming a cement making mixture and fuel into pellets, igniting a bed of said pellets at its upper surface and forcing air downwardly through said bed of pellets to sinter and convert said pellets throughout to cement, during said ignition and sintering, protecting said bed on its sides and bottom with a layer of sintered material, the lower part of said layer being of coarse material and the upper part of finer material.

5. A method of sintering cement mixes which comprises forming a cement making mixture and fuel into pellets, igniting a bed of said pellets at its upper surface and forcing air downwardly through said bed of pellets to sinter and convert said pellets throughout to cement, said bed having a thickness of not less than 8 mesh.

6. A method of sintering cement mixes which comprises forming a cement making mixture and fuel into pellets, igniting a bed of said pellets at its upper surface and forcing air downwardly through said bed of pellets to sinter and convert said pellets throughout to cement, dividing the chilled fused material and returning part of it for admixture with a succeeding mixture to be treated.

REED W. HYDE.